United States Patent
McMullen et al.

(10) Patent No.: US 11,297,044 B2
(45) Date of Patent: *Apr. 5, 2022

(54) ENCRYPTED PURGING OF DATA FROM CONTENT NODE STORAGE

(71) Applicant: Fastly, Inc., San Francisco, CA (US)

(72) Inventors: Tyler B. McMullen, San Francisco, CA (US); Artur Bergman, San Francisco, CA (US)

(73) Assignee: Fastly, Inc., San Francisco, CA (US)

( * ) Notice: Subject to any disclaimer, the term of this patent is extended or adjusted under 35 U.S.C. 154(b) by 61 days.

This patent is subject to a terminal disclaimer.

(21) Appl. No.: 15/642,617

(22) Filed: Jul. 6, 2017

(65) Prior Publication Data
US 2017/0310650 A1    Oct. 26, 2017

Related U.S. Application Data

(63) Continuation of application No. 15/250,063, filed on Aug. 29, 2016, now Pat. No. 9,742,748, which is a
(Continued)

(51) Int. Cl.
*H04L 29/00* (2006.01)
*H04L 29/06* (2006.01)
(Continued)

(52) U.S. Cl.
CPC ........ *H04L 63/061* (2013.01); *G06F 12/1408* (2013.01); *G06F 16/162* (2019.01);
(Continued)

(58) Field of Classification Search
CPC .................................. H04L 9/00; G06F 12/12
(Continued)

(56) References Cited

U.S. PATENT DOCUMENTS 7,111,057 B1 *   9/2006   Sherman ............. G06F 17/3089
                                                            707/999.01
8,320,560 B2    11/2012   Orsini et al.
(Continued)

FOREIGN PATENT DOCUMENTS

EP          1777639 A1    4/2007
WO          01/59617 A1   8/2001

OTHER PUBLICATIONS

Christian Cachin et al. "Policy-Based Secure Deletion." International Association for Cryptologic Research. vol. 20130315:043608, pp. 1-23. Mar. 14, 2013.
(Continued)

*Primary Examiner* — Jeffrey C Pwu
*Assistant Examiner* — Michael D Anderson

(57) ABSTRACT

Described herein are methods, systems, and software for encrypting and erasing data objects in a content node. In one example, a method of operating a content node that caches content divided into one or more data objects includes encrypting the one or more data objects using separate encryption keys for each of the one or more data objects, the separate encryption keys comprising a common portion shared by the one or more data objects and an individualized portion unique to each data object. The method further provides receiving a purge request to erase at least one data object and, responsive to the purge request, erasing at least one of the common portion or the individualized portion for the at least one data object based on the purge request.

20 Claims, 10 Drawing Sheets

Related U.S. Application Data continuation of application No. 14/308,452, filed on Jun. 18, 2014, now Pat. No. 9,430,405.

(51) Int. Cl.
G06F 12/14 (2006.01)
G06F 16/16 (2019.01)
G06F 21/62 (2013.01)
H04L 9/08 (2006.01)
G06F 21/10 (2013.01)
G06F 21/60 (2013.01)

(52) U.S. Cl.
CPC ............ G06F 21/10 (2013.01); G06F 21/602 (2013.01); G06F 21/6218 (2013.01); H04L 9/0861 (2013.01); *G06F 2212/1052* (2013.01); *G06F 2221/2107* (2013.01); *G06F 2221/2143* (2013.01); *H04L 2209/60* (2013.01)

(58) Field of Classification Search
USPC ........................................................ 713/193
See application file for complete search history.

(56) References Cited

U.S. PATENT DOCUMENTS 9,165,158 B2 * 10/2015 Li ........................... H04L 9/083
2005/0021984 A1 1/2005 Hollander
2012/0173822 A1 7/2012 Testardi et al.
2013/0305057 A1 11/2013 Greco et al.

OTHER PUBLICATIONS

Joel Reardon et al. "Data Node Encrypted File System: Efficient Secure Deletion for Flash Memory." USENIX. pp. 1-16. Apr. 11, 2013.

* cited by examiner

ENCRYPTED PURGING OF DATA FROM CONTENT NODE STORAGE

RELATED APPLICATIONS

This application is a continuation of, and claims the benefit of and priority to, U.S. application Ser. No. 15/250,063, filed on Aug. 29, 2016, entitled "ENCRYPTED PURGING OF DATA FROM CONTENT NODE STORAGE," which itself is a continuation of, and claims the benefit of and priority to, U.S. application Ser. No. 14/308,452, filed on Jun. 18, 2014, entitled "ENCRYPTED PURGING OF DATA FROM CONTENT NODE STORAGE," which are hereby incorporated by reference in their entirety.

TECHNICAL BACKGROUND

Network-provided content, such as Internet web pages or media content such as video, pictures, music, and the like, are typically served to end users via networked computer systems. End user requests for the network content are processed and the content is responsively provided over various network links. These networked computer systems can include hosting servers, which host network content of content creators or originators, such as web servers for hosting a news website. However, these originating computer systems can become overloaded and slow due to frequent requests of content by end users.

To assist the origin servers, content delivery networks have been developed that create a layer of caching between the origin servers and the end users. These content delivery networks typically have one or more content nodes, or cache nodes, distributed across a large geographic region to provide faster and lower latency access to the content for the end users. In operation, content from the origin servers can be cached into the content nodes, and can be requested via the content nodes from the origin server when the content has not yet been cached. Content nodes usually cache only a portion of the original source content rather than caching all content or data associated with an original content source. As such, content may need to be deleted or purged from the system based on updating the content, an administrator request to remove content from the nodes, a lack of use of the content, or for any other purpose.

OVERVIEW

Methods, systems, and software are included for encrypting and erasing data objects in a content node. In one example, a method of operating a content node that caches content for delivery to end user devices, the content divided into one or more data objects, includes encrypting the one or more data objects using separate encryption keys for each of the one or more data objects, the separate encryption keys comprising a common portion shared by the one or more data objects and an individualized portion unique to each data object. The method further provides receiving a purge request to erase at least one data object and, responsive to the purge request, erasing at least one of the common portion or the individualized portion for the at least one data object based on the purge request.

In another example, a method of operating a content node that caches one or more data objects includes, in response to a purge request to erase at least one data object, identifying at least one key associated with each of the at least one data object. The method further provides erasing at least a portion of the at least one key.

In another instance, a computer apparatus for operating a content node to cache content divided into one or more objects includes processing instructions that direct the content node to encrypt the one or more data objects using separate encryption keys for each of the one or more data objects, the separate encryption keys comprising a common portion shared by the one or more data objects and an individualized portion unique to each data object. The processing instructions further direct the content node to receive a purge request to erase at least one data object and, responsive to the purge request, erase at least one of the common portion or the individualized portion for the at least one data object based on the purge request. The computer apparatus also includes one or more non-transitory computer readable media that store the processing instructions.

BRIEF DESCRIPTION OF THE DRAWINGS

The following description and associated figures teach the best mode of the invention. For the purpose of teaching inventive principles, some conventional aspects of the best mode can be simplified or omitted. The following claims specify the scope of the invention. Note that some aspects of the best mode cannot fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DESCRIPTION

Figure 1:
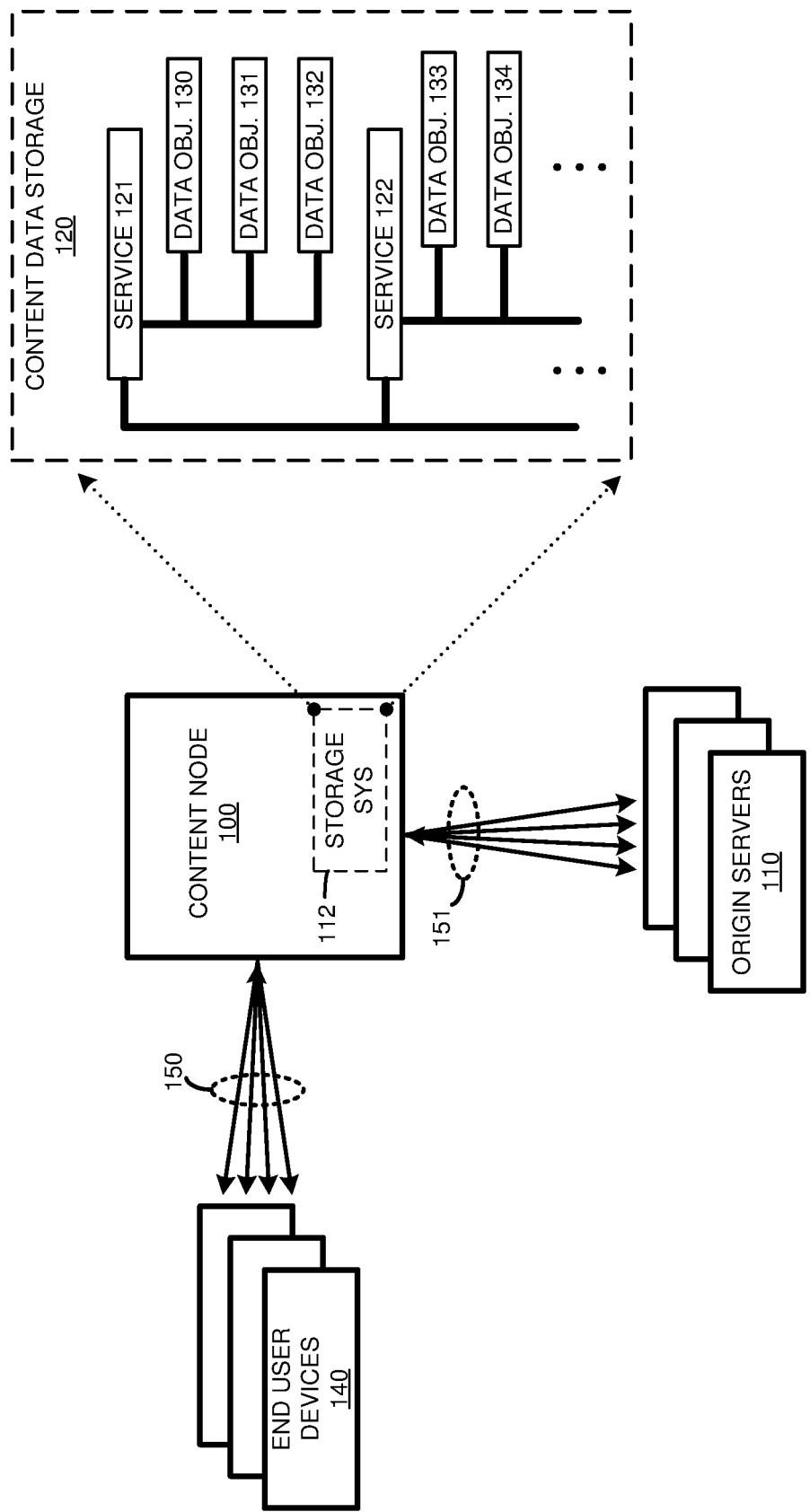
FIG. 1 illustrates a content node for encrypting and erasing data objects.

Network content, such as web page content, typically includes content such as text, hypertext markup language (HTML) pages, pictures, video, audio, animations, code, scripts, or other content viewable by an end user in a browser or other application. This various network content can be stored and served by origin servers and equipment. However, when a content delivery network is employed, the content delivery network can act as a proxy to cache content delivery between origin servers and the end user devices.

Content delivery networks can add a layer of caching between origin servers of the content providers and the end users. The content delivery networks typically have one or more content nodes (CNs), or cache nodes, distributed across a large geographic region to provide faster and lower latency local access to the content for the end users. When end users request content, such as a web page, a locally proximate content node will respond to the content request instead of the associated origin server. Various techniques can be employed to ensure the content node responds to content requests instead of the origin servers, such as associating web content of the origin servers with network addresses of the content nodes.

In many examples of a CN, multiple network content sources are handled by a single CN. For example, a CN can be configured to cache website content of many different websites of many different website content originators. A CN may further only cache portions of the original content source to provide the most frequently accessed content to the end user devices. As a result, content and data objects that are stored on the content node may need to purged and updated to reflect changes in the source content, changes in the requests from the end user devices, or for a variety of other purposes.

In the present instance, data objects, which may represent images, videos, music files, and the like, are stored on a CN using encrypted keys. These encrypted keys include multiple portions that allow an administrator or some other administration process to quickly purge content from the content node. A first portion of the key may be unique for each of the data objects stored on the CN, a second portion of the key may be common for a group of data objects, such as all data objects from website or service, and a third portion may be common to all data objects that are stored in the CN. As a result of this key structure, if an administration system wishes to purge content from the CN, the CN may simply delete the appropriate portion of the encrypted keys. For instance, if it is desired to purge all content, the global portion may be deleted, or if it is desired only to delete a subset of data objects, the individualized portion for those objects may be deleted. As a result, rather than overwriting the actual objects in the CN, portions of the key may be deleted to prevent decryption of the objects that may remain on the CN.

In some examples, metadata structures may be used which allow the encrypted keys to be stored separate from the data objects they encrypt. These metadata structures may be stored in random access memory with pointers or addresses to the encrypted data in solid state or other storage devices. Based on this arrangement, a purge may be executed without writing to a solid state storage device, limiting the number of writes that need to be executed on the device.

As a first example, FIG. 1 is provided which illustrates a communication system for providing content to end user devices. FIG. 1 includes content node (CN) 100, origin servers 110, and end user devices 140. Content node 100 further includes storage system 112, which is used for content data storage 120. End user devices 140 communicate with CN 100 over communication links 150, and CN 100 further communicates with origin servers 110 over communication links 151.

CN 100, origin servers 110, and end user devices 140 may each include communication interfaces, network interfaces, processing systems, computer systems, microprocessors, storage systems, storage media, or some other processing devices or software systems. End user devices 140 may each be a user device, subscriber equipment, customer equipment, access terminal, smartphone, personal digital assistant (PDA), computer, tablet computing device, e-book, Internet appliance, media player, game console, or some other user communication apparatus, including combinations thereof. CN 100 and origin servers 110 may each be a server computer, desktop computer, or any other serving device capable of storing content to be provided to end user devices Communication links 150-151 each use metal, glass, optical, air, space, or some other material as the transport media. Communication links 150-151 can each use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication links 150-151 can each be a direct link or can include intermediate networks, systems, or devices, and can include a logical network link transported over multiple physical links.

In this example, storage system 112 on CN 100 includes content data storage 120. Content data storage 120 caches content from origin servers 110 to be provided to end user devices 140. Here, content is illustrated for two services 121-122 that may comprise websites or some other similar digital service. Services 121-122 include data objects 130-134 that are cached from origin servers to be provided to the end user devices. For example, an end user device may request data object 130 from CN 100. Responsive to this request, CN 100 is configured to identify data object 130 and provide the data object to the end user device.

In the present instance, data objects 130-134 are encrypted when they are stored in storage system 112. As a result, each of data objects 130-134 requires an encryption key to view the cached content. If the key is no longer available, the content becomes inaccessible to users and processes that wish to access it. However, if the key is available, the data object may be decrypted and the content accessed by the end user or some other process.

Figure 2:
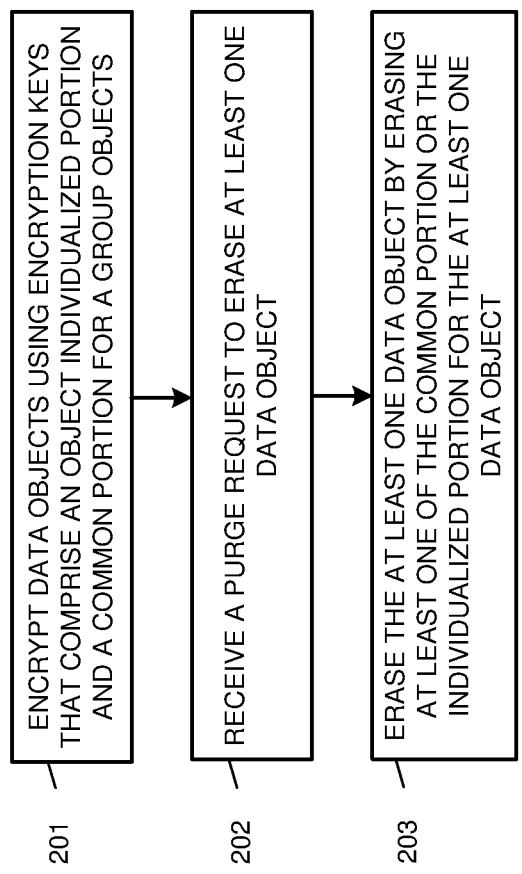
FIG. 2 illustrates a flow diagram for encrypting and erasing data objects on a content node.

To further illustrate the operation of CN 100, FIG. 2 is provided. FIG. 2 illustrates a method of operating a content node to encrypt and erase data objects. The operations of FIG. 2 are referenced parenthetically in the description below.

In FIG. 2, CN 100 encrypts (201) data objects using encryption keys that comprise an object individualized portion unique to each data object and a common portion for a group of objects, such as all objects for a website or service. These encryption keys allow the objects to be stored in storage system 112, but only become understandable if the key is available. In the present example, a variety of websites and other Internet based services may require the caching of data objects on a CN, such as CN 100. When the caching is required, each of the services may be assigned a common portion of a security key that may be used for all data objects cached for that service. Additionally, each of the objects that are cached may be assigned an individualized portion that may be combined with the common portion to create a unique security key or keys for each of the data objects stored. For instance, returning to FIG. 1, data object 130 and data object 131 may include the same common portion of an encryption key, but each will also contain a unique portion that differentiates the key in data object 130 from the key data object 131.

Once the content data objects are encrypted and stored, CN 100 may receive (202) a purge request to erase at least one data object. This purge request may be generated from an administration system, from CN 100, or from any other system with the ability to purge data objects within CN 100.

In response to the purge request, CN 100 erases (203) the at least one data object by erasing at least one of the common portion or the individualized portion for the at least one data object. In one example, the purge request indicates all of the data objects stored for a particular common key portion should be purged. As a result, CN 100 will erase the common portion of the security key to prevent access to all of the data objects stored in CN 100 associated with that common portion. For instance, a purge request may indicate that all content for service 121 should be purged. Responsively, the common encryption key portion for data objects 130-132 will be erased.

In an alternative example, a user may request that any subset of the data objects stored be erased. Accordingly, the individualized portion of the encryption key for the subset of data objects may be erased. Referring again to FIG. 1, a purge request may indicate that data object 130 and data object 131 should be removed from CN 100. In response to this purge request, the individualized portion of the key for data objects 130-131 can be erased.

Figure 3:
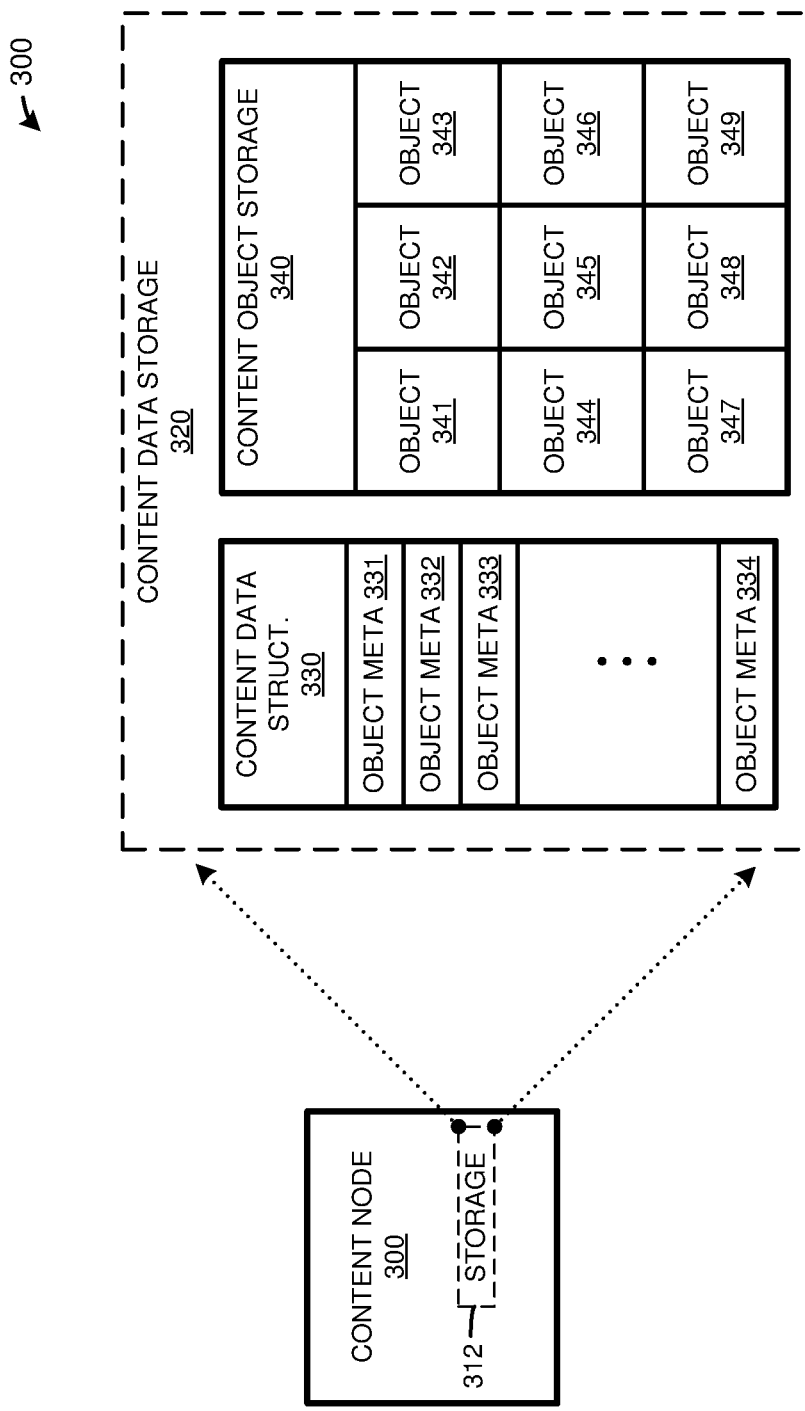
FIG. 3 illustrates the storage of encrypted data objects in a content node.

Referring now to FIG. 3, FIG. 3 illustrates the storage of data objects within a content node according to one example. FIG. 3 includes content node (CN) 300. CN 300 includes storage 312, and may further include processing systems, user interfaces, communication interfaces, and other computing elements. Storage 312 further includes content data storage 320 that is used to store cached data objects from origin servers. Content data storage 320 further includes content data structure 330 for object metadata 331-334, and further includes content object storage for data objects 341-349.

In operation, CN 300 caches data objects from one or more origin servers that host websites and other web services. These data objects may include pictures, movies, and audio files, amongst other possible data objects. Once a data object is received from the origin servers, the data object is encrypted and placed in content data storage 320. In this example, the storage of a data object includes the storage of metadata and the storage of the object itself. The metadata for each object is placed in content data structure 330, which may reside in random access memory for some examples, and the content object itself is stored in content object storage 340. Each one of object metadata 331-334 may include the encryption key associated with a data object in content object storage 340, a reference address for the corresponding object in content object storage 340, as well as any other relevant information regarding the object. The encryption key stored in the metadata may include two portions in some examples, a first portion that is a common portion associated with one or more data objects, such as all objects from same website or service, and an individualized portion that is unique for each of the encryption keys.

In an illustrative example, data object 341 may be received by CN 300 to be stored in content data storage 320. Once received, CN 300 encrypts data object 341 using an encryption key, and stores the object in content object storage 340. This encryption key includes a common portion that is shared with other objects, such as objects from the same website or service, and further includes a unique portion that is used to distinguish the encrypted key for the object. Further, the encryption key may be stored in content data structure 330 along with other metadata related to data object 341, such as the address of the object in memory or any other related information. This metadata may be stored in any one of object metadata 331-334.

Once data object 341 is stored with other data objects, an administration system or some other mechanism may initiate a purge request of one or more data objects stored in content storage 320. If only data object 341 is to be erased, CN 300 may delete the individualized portion of the encryption key associated with the object. In contrast, if all of the data objects associated the common portion of the encryption key are to be erased, the common portion of the encryption key may erased, eliminating access to the information stored in the data objects.

Figure 4:
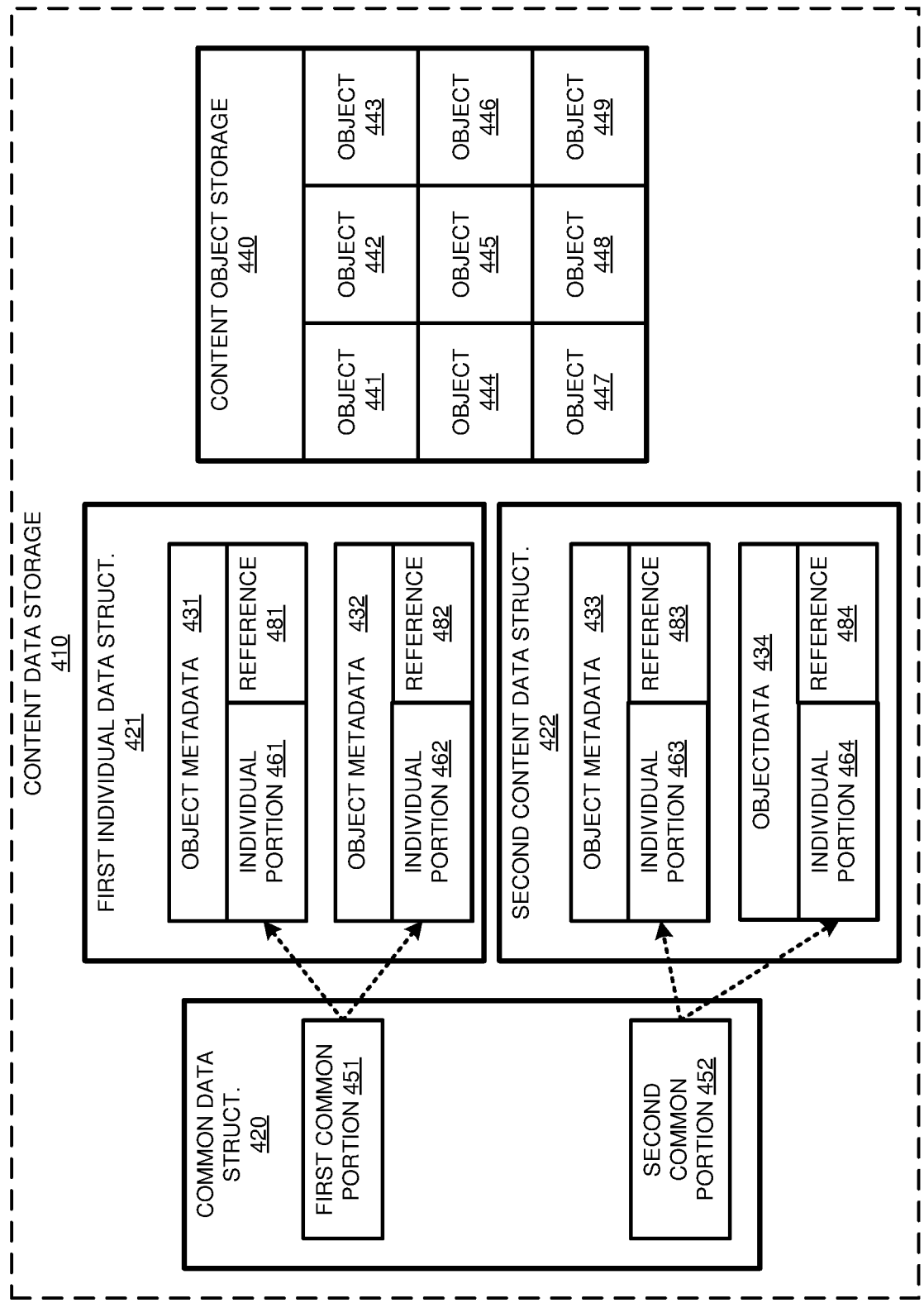
FIG. 4 illustrates content data storage within a content node for storing encrypted data objects.

To further illustrate the operation of a content node, FIG. 4 is provided. FIG. 4 illustrates content data storage 410 within a content node for storing encrypted data objects. Content data storage 410 includes common data structure 420, first individual data structure 421, second individual data structure 422, and content object storage 440. Common data structure 420 further includes common key portions 451-452. Individual data structures 421-422 further include object metadata 431-434, which comprises individual key portions 461-464 and references 481-484.

In operation, content objects 441-449 are cached for one or more origin servers. These objects comprise pictures, movies, or a variety of other content for one or more websites or web services. Once the content node receives the objects, the objects are encrypted prior to storage in content object storage 440 using an encryption key. This encryption key includes an individualized portion that is unique for the object, as well as a common portion that may be tied to a group of objects, such as all objects from the same website or service provider.

Once the objects are stored, metadata structures are used to store the encryption key and reference the data object to which it belongs. In the present example, common data structure 420 stores the common portions 451-452 of the encryption keys, and individual data structures 421-422 stores the individual portions 461-464 of the encryption keys. Although illustrated as three tables in the present example, it should be understood that the metadata provided in data structures 420-422 might be implemented in any number of metadata structures.

To access a data item, a common portion from common data structure 420 must be combined with an individual portion from individual data structures 421-422. For example, if a user wanted access to the data object at reference 481, first common portion 451 would be combined with individual portion 461 to make the encryption key for that data object. In contrast, if a user wanted access to reference 484, second common portion 452 would be combined with individual portion 464 to make the encryption key for that data object. Once the encryption keys are applied to the data object, the user may have access to the unencrypted version of that object.

Figure 5:
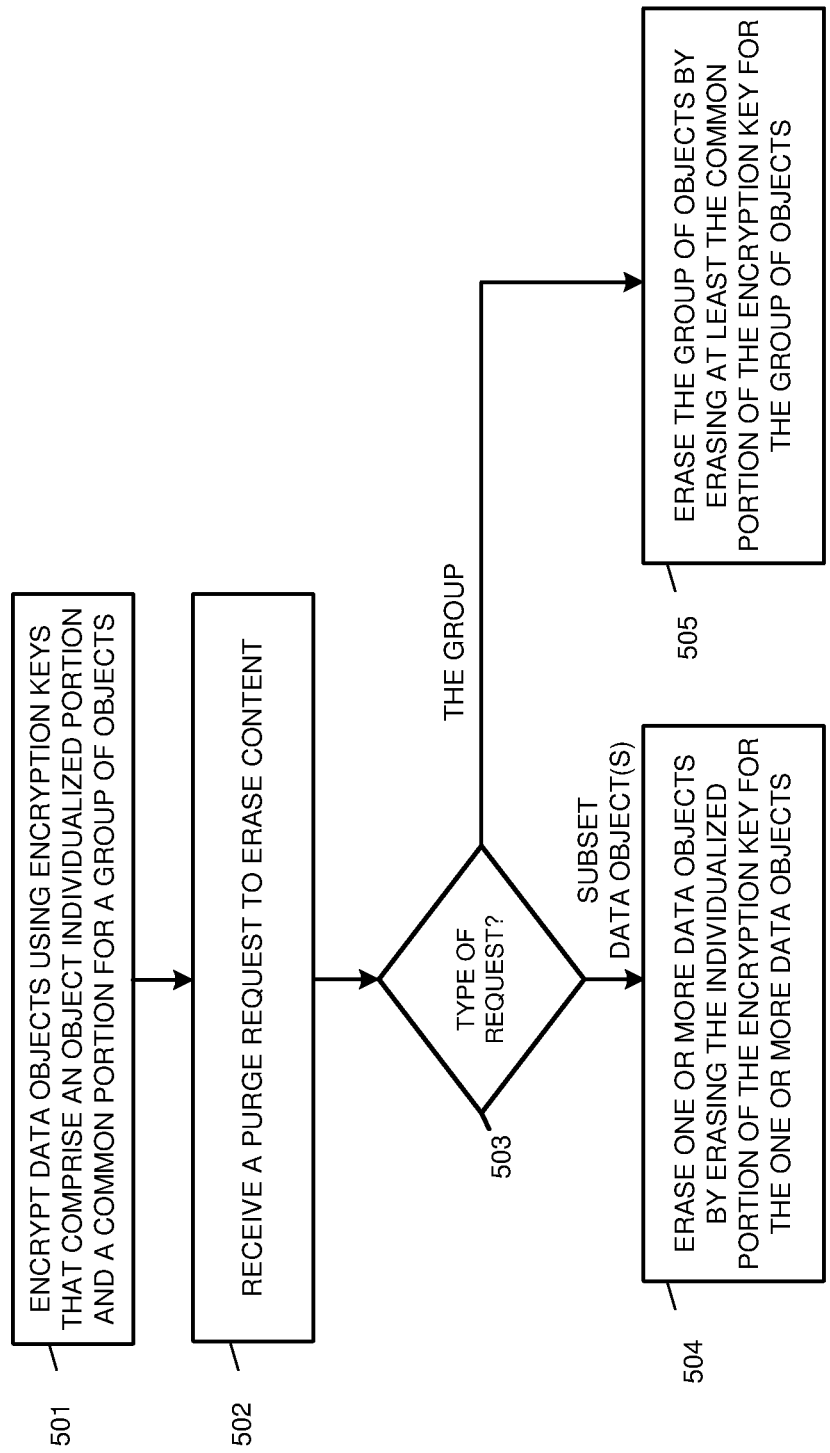
FIG. 5 illustrates a flow diagram for operating a content node to encrypt and erase data objects.

Turning to FIG. 5 to further illustrate the deletion of a data object from a content node. FIG. 5 illustrates a flow diagram for operating a content node to encrypt and erase data objects from content data storage 410. The operations of FIG. 5 are referenced parenthetically in the description below.

As depicted in FIG. 5, data objects to be cached in content data storage 410 are encrypted (501) using encryption keys that comprise an object individualized portion and a common portion that may be assigned to a group of objects, such as all objects from the same website or service. Once the objects are stored, the content node may receive (502) a purge request from an administrator or some other administration system. In response to the purge request, the content node is configured to identify (503) the type of purge request. In one example, the purge request may only be for selective subset of one or more data objects within content data storage 410. As a result of this request, the content node erases (504) the one or more data objects by erasing the individualized portion of the encryption key for the one or more data objects. For example, a purge request may identify that two objects associated with reference 481 and reference 483 that are to be purged from the system. These references are used as a pointer to the actual data object in content object storage 440. Responsive to the purge request, the content node erases individual portion 461 and individual portion 463 of the encryption keys for both of the data objects. As a result of this erasing, the key is no longer available to decrypt the data objects in content object storage 440.

In an alternative purge example, the purge request may indicate a desire to delete the group of data objects associated with a common portion of an encryption key. In response to the request, the content node is configured to erase (505) at least the common portion of the encryption key for the group of data objects. Referring back to FIG. 4 as an example, a purge request may indicate a desire to purge all content associated with second common portion 452. Responsive to the request, the content node erases at least second common portion 452, which prevents the decryption of content referenced by references 483-484.

Figure 6:
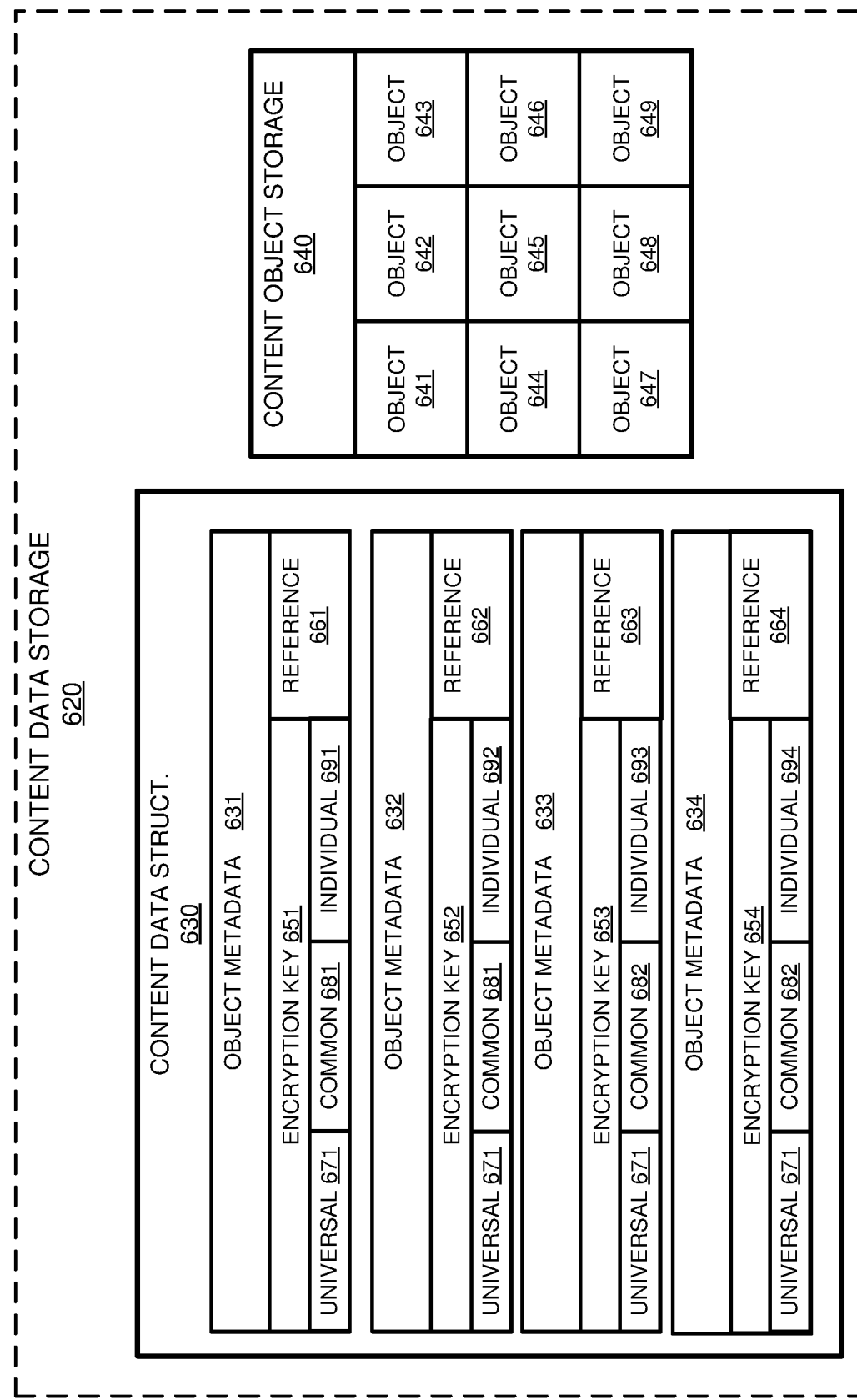
FIG. 6 illustrates content data storage within a content node for storing encrypted data objects.

Referring to FIG. 6, FIG. 6 illustrates content data storage within a content node according to another example. FIG. 6 includes content data storage 620, which further includes content data structure 630 and content object storage 640. Content data structure 630 is configured to store object metadata 631-634 information for data objects in content object storage 640, including the encryption keys 651-654, as well as references 661-664 to the data objects in content object storage 640. Although illustrated as a single data structure for simplicity, it should be understood that content data structure 630 might be divided into a number of different data structures, similar to the data structures in FIG. 4.

In operation, data objects 641-649 are cached in content data storage 620 to be provided to end user devices. When the content node receives data objects, the objects are encrypted using encryption keys, such as keys 651-654 that comprise universal 671, common 681-682, and individual 691-694 portions. The universal portion applies to all objects within a content node regardless of the service. The common portion applies to a group of one or more objects within the content node, and may apply to all objects for a single service or website. The individual portion is the individualized portion of the key and is unique to the individual object.

As illustrated in FIG. 6, content data structure 630 stores metadata associated with the each of the objects. This metadata includes the encryption key as well as a reference or pointer that is linked to the actual storage of the object in content object storage 640. Although all portions of the key are illustrated in each metadata item 631-634, multiple data structures may be employed for storing metadata associated with objects. For example, one data structure may be used for the global portion, another for the common portions, and another for the individual portions. Once stored, the encryption key or portions thereof may be erased to prevent further access to the content.

Figure 7:
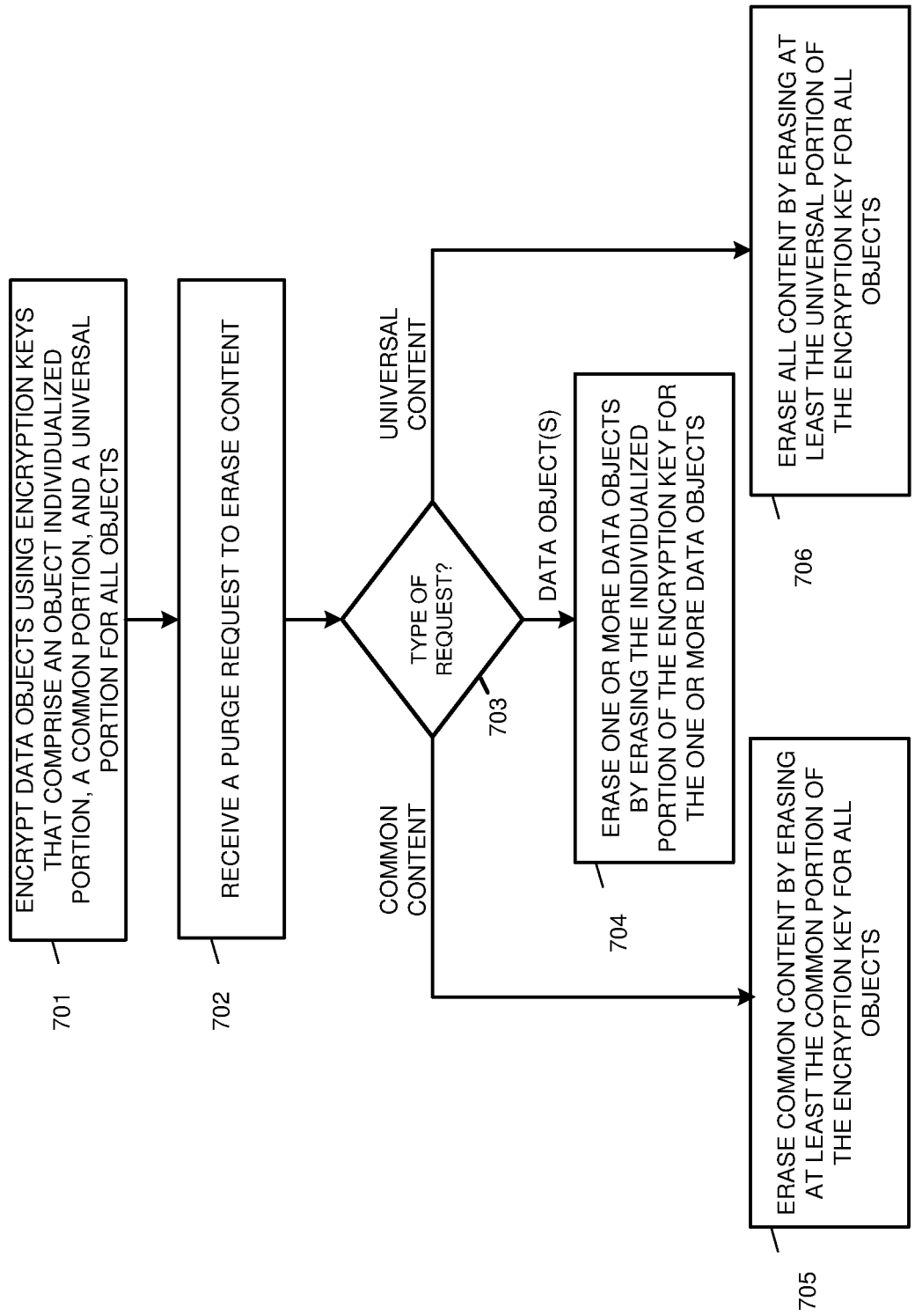
FIG. 7 illustrates a flow diagram for operating a content node to encrypt and erase data objects.

Turning now to FIG. 7 to further illustrate the deletion of one or more data objects from a content node. FIG. 7 illustrates a method of operating a content node to encrypt and erase data objects from content data storage 620. The operations of FIG. 7 are referenced parenthetically in the description below.

As illustrated in FIG. 7, data objects to be cached in content data storage 620 are encrypted (701) using encryption keys that comprise an object individualized portion, a common portion that applies to a group of objects often of the same website or service, and a global portion that applies to all of the objects within the content node. Once the encryption keys encrypt the data objects, the content node may receive (702) a purge request indicating a desire to erase content from content data storage 620. In response to the request, the content node determines (703) the type of purge requested. In some examples, the purge may include a request to remove a subset of one or more individual data objects from the content storage. Responsive to this request, the content node erases (704) the one or more individual data objects by erasing the individualized portion of the encryption key for the one or more individual data objects. For example, referring back to FIG. 6, a purge request may indicate a desire to erase the content associated with object metadata 631. Accordingly, the content node will erase individual portion 691 from encryption key 651 to prevent further access to the object.

In another instance, a purge request may indicate a desire to purge all content objects associated with a common portion of an encryption key. In response to the request, the content node identifies the common portion, and erases (705) at least the common portion of the encryption key. For example, a purge request may wish to delete all of the data objects associated with common portion 682. Accordingly, the content node will erase common portion 682 to prevent access to all of the objects encrypted with that common portion.

In still another example, a purge request may indicate a desire to remove all of the content from the content node. Responsive to the request, the content node will erase (706) at least the universal portion 671 of the encryption key to prevent the decryption of any of the data objects stored on the content node.

Figure 8:
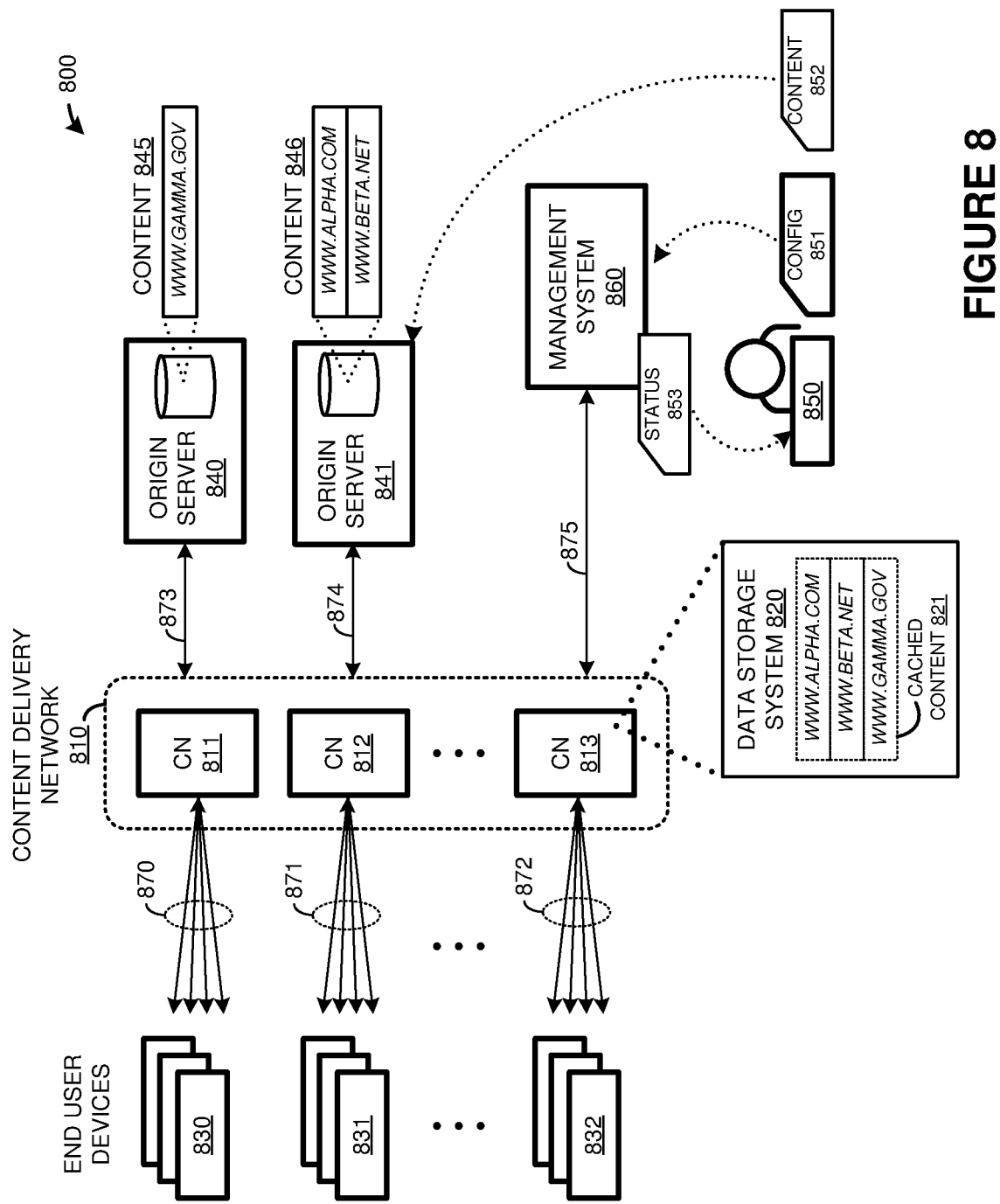
FIG. 8 illustrates a communication system for providing content to end users using content nodes.

As an example employing multiple content nodes in a content delivery network, FIG. 8 is presented. FIG. 8 can include one or more of CN 100 of FIG. 1, which can handle content requests from various end user devices, such as end user devices 140. FIG. 8 is a system diagram illustrating communication system 800. Communication system 800 includes content delivery network 810, end user devices 830-832, origin servers 840-841, and management system 860. Content delivery network 810 includes one or more content nodes (CN) 811-813. Each of CN 811-813 can include one or more data storage systems, such as that illustrated for CN 813 as data storage system 820. Data storage system 820 can be an example of content data storage 120 of FIG. 1. End user devices 830-832 are representative of a plurality of end user devices, which can request and receive network content, and any number of end user devices 830-832 can be associated with each of content nodes 811-813. CN 811-813 and ones of end users 830-832 communicate over associated network links 870-872. Content delivery network 810 and origin servers 840-841 communicate over associated network links 873-874. Content delivery network 810 and management system 860 communicate over link 875. Although not shown in FIG. 8 for clarity, each of CN 811-813 can also communicate with each other over network links.

To further illustrate FIG. 8, a brief description of the operation of communication system 800 is included. In operation, end user devices 830-832 request network content, such as content 845-846 associated with origin servers 840-841. Instead of these requests being handled by the individual origin servers 840-841, individual content nodes 811-813 of content delivery network 810 receive the content requests over ones of links 870-872 and process the content requests for delivery of the content to the associated end user devices 830-832. Requested network content that is already stored in ones of CN 811-813 can be provided quickly to the end user devices, while network content that is not already stored in ones of CN 811-813 can be responsively requested by an associated one of CN 811-813 from an appropriate origin server 840-841 for delivery by the CN and possible caching by the CN. In this manner, each of CN 811-813 can act as intermediary proxy nodes to provide local and fast access for end user devices 830-832 to network content of origin servers 840-841 without burdening origin servers 840-841. FIG. 8 shows cached content 821 included in data storage system 820 of CN 813 as comprised of content 845-846, and thus content 845-846 is currently shown as cached by CN 813. Other configurations are possible, including subsets of content 845-846 being cached in individual ones of CN 811-813.

Although FIG. 8 shows content 845-846 of origin servers 840-841 being cached by data storage system 820, CN 811-813 can handle other content. For example, dynamic content generated by activities of end user devices 830-832 need not originally reside on origin servers 840-841, and can be generated due to scripting or code included in web page content delivered by CN 811-813. This dynamic content can also be cached by ones of CN 811-813, and can be specific to a particular end user device during a communication session.

Management system 860 handles configuration changes and status information for system operators and for the origin server operators or managers. For example, administrator 850 can use management system 860 to transfer configuration 851 to content delivery network 810. Configuration 851 may alter the handling of network content requests by CN 811-813, may purge content from CN 811-813, or may provide other configuration information. Also, management system 860 can monitor status information for the operation of CN 811-813, such as operational statistics, and provide this status information as 853 to administrator 850. Although one management system is illustrated in the present example, it should be understood that any number of management systems may be employed.

In the present example of system 800, CNs 811-813 are configured to encrypt the content that is cached for the end user devices. Specifically, CNs 811-813 encrypt the content that is stored using an encryption key for each data object stored. The encryption key may include multiple portions that allow the key to have a unique individualized portion, but also common portions that group the data object with other data objects. Once the object is stored, CNs 811-813 may receive purge requests to remove one or more data objects from the nodes. These requests may come from an administrator, the origin servers, a management system, or any other purge source. Responsive to these requests, CNs 811-813 may erase one or more portions of the encryption keys associated with the one or more data objects to prevent further access to the data objects. For example, an administrator or some other similar service may wish to delete a single data object from the content nodes. Once the request is identified, the individualized portion of the encryption key for that data object may be deleted. In other instances, the administrator or service may request that a group of the data objects be erased. If this group shares a common portion of an encryption key, then the common portion may be erased to prevent further access to the identified data objects. In some examples, the common portion of the encryption key may be assigned based on the service or website that the items belong. Referring to data storage system 820, www.alpha.com may have a different common portion than www.beta.net. As a result, if an administrator wished to delete all objects associated with www.alpha.com, the common key portion for www.aplha.com may be erased.

Referring back to the elements of FIG. 8, CN 811-813, origin servers 840-841, and management system 860 can each include communication interfaces, network interfaces, processing systems, computer systems, microprocessors, storage systems, storage media, or some other processing devices or software systems, and can be distributed among multiple devices. Examples of CN 811-813, origin servers 840-841, and management system 860 can each include software such as an operating system, logs, databases, utilities, drivers, caching software, networking software, and other software stored on a computer-readable medium. Content delivery network 810, in addition to including CN 811-813, can include equipment and links to route communications between CN 811-813 and any of end user devices 830-832, origin servers 840-841, and management system 860, among other operations.

End user devices 830-832 can each be a user device, subscriber equipment, customer equipment, access terminal, smartphone, personal digital assistant (PDA), computer, tablet computing device, e-book, Internet appliance, media player, game console, or some other user communication apparatus, including combinations thereof.

Communication links 870-875 each use metal, glass, optical, air, space, or some other material as the transport media. Communication links 870-875 can each use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication links 870-875 can each be a direct link or can include intermediate networks, systems, or devices, and can include a logical network link transported over multiple physical links. Although one main link for each of links 870-875 is shown in FIG. 8, it should be understood that links 870-875 are merely illustrative to show communication modes or access pathways. In other examples, further links can be shown, with portions of the further links shared and used for different communication sessions or different content types, among other configurations. Communication links 870-875 can each include many different signals sharing the same associated link, as represented by the associated lines in FIG. 8, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

Figure 9:
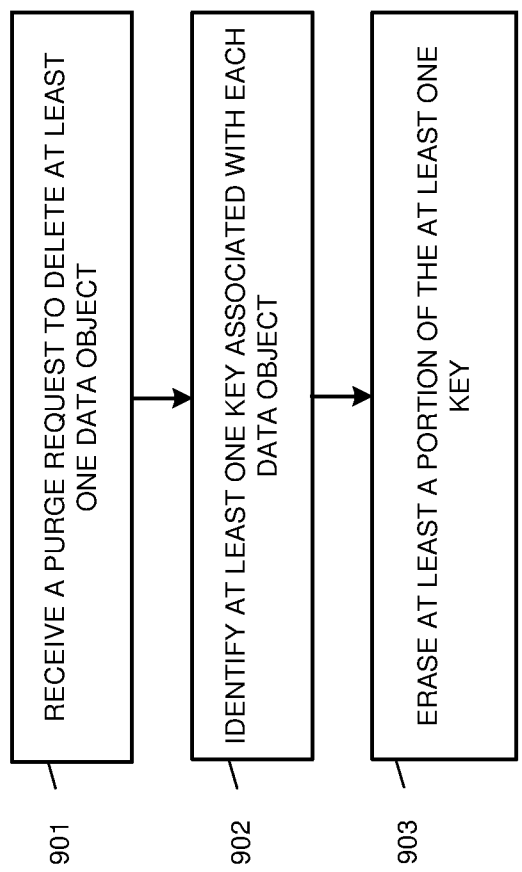
FIG. 9 illustrates a flow diagram for operating a content node to erase data objects.

Although the previous examples addressed unique keys with multiple portions for each object, it should be understood that the keys for the objects might be divided into any number of portions. Further, any number of keys may be used to encrypt the data objects cached on a content node. For example, FIG. 9 is included that illustrates a flow diagram for operating a content node to purge encrypted content cached from one or more origin servers. The operations of FIG. 9 are referenced parenthetically in the description below.

In operation, a content node is configured to encrypt data objects from one or more origin servers and provide the data objects to end user devices. Once the objects are encrypted, the content node is configured to receive (901) a purge request generated by an administrator or some other process to delete at least one data object stored on the content node. In response to the purge request, the content node identifies (902) at least one key associated with each of the at least one data object, and erases (903) at least a portion of the at least one key. By deleting the key associated with purged data objects, the data object may no longer be decrypted, effectively deleting the data object without removing the object itself.

In some instances, portions of the at least one key may be used to link one or more data objects together. For example, all data objects for a website or service may share a common portion. Accordingly, if a purge request wished to erase all data objects associated with the website or service, the common portion may be erased to prevent access to the content. Further, the at least one key may contain an individualized portion, which allows subsets of the data objects to be erased when they do not share a common portion.

Figure 10:
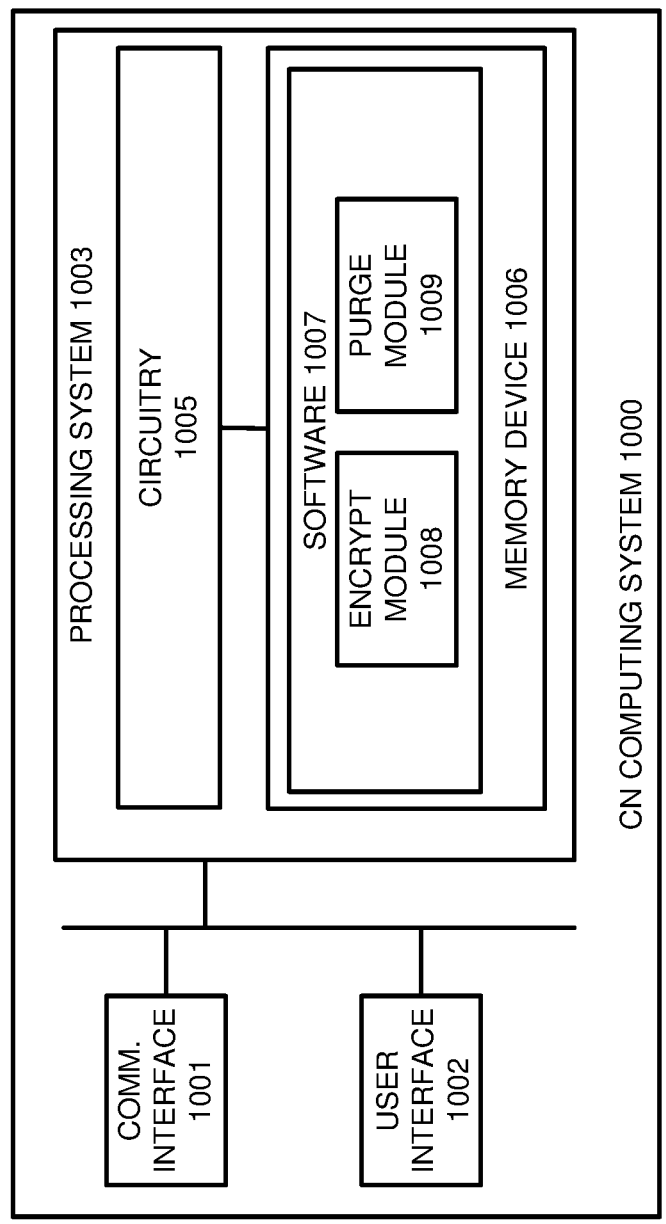
FIG. 10 illustrates a content node computing system for erasing data objects.

Turning now to FIG. 10, FIG. 10 illustrates a content node (CN) computing system 1000 for encrypting and erasing data objects. CN computing system 1000 is an example of CNs 100, 300, and 811-813, although other examples may exist. CN computing system 1000 comprises communication interface 1001, user interface 1002, and processing system 1003. Processing system 1003 is linked to communication interface 1001 and user interface 1002. Processing system 1003 includes processing circuitry 1005 and memory device 1006 that stores operating software 1007.

Communication interface 1001 comprises components that communicate over communication links, such as network cards, ports, RF transceivers, processing circuitry and software, or some other communication devices. Communication interface 1001 may be configured to communicate over metallic, wireless, or optical links. Communication interface 1001 may be configured to use TDM, IP, Ethernet, optical networking, wireless protocols, communication signaling, or some other communication format—including combinations thereof. In some examples, communication interface 1001 may be used to communicate with origin server and end user devices to cache and provide data objects.

User interface 1002 comprises components that interact with a user. User interface 1002 may include a keyboard, display screen, mouse, touch pad, or some other user input/output apparatus. User interface 1002 may be omitted in some examples.

Processing circuitry 1005 comprises microprocessor and other circuitry that retrieves and executes operating software 1007 from memory device 1006. Memory device 1006 comprises a non-transitory storage medium, such as a disk drive, flash drive, data storage circuitry, or some other memory apparatus. Operating software 1007 comprises computer programs, firmware, or some other form of machine-readable processing instructions. Operating software 1007 includes encryption module 1008 and purge module 1009. Operating software 1007 may further include an operating system, utilities, drivers, network interfaces, applications, or some other type of software. When executed by circuitry 1005, operating software 1007 directs processing system 1003 to operate CN computing system 1000 as described herein.

In one example, CN computing system 1000 is configured to cache content divided into one or more data objects for one or more websites or services. To accomplish this task, encryption module 1008 encrypts the data objects using at least one key. Once encrypted, computing system 1000 may receive a purge request to erase at least one data object from an administrator, an automated process, or some other purge mechanism. Responsive to the purge request, purge module 1009 identifies at least one key associated with each of the requested purge data objects, and erases at least a portion of the at least one key.

In some examples, the one or more keys for each of the data objects may include portions that link the keys to other related data objects. For example, all data objects from a website or service may include a common portion to their at least one key. Accordingly, a purge request may desire to remove all content associated with the website or service, and the content may be removed by erasing at least the common portion of the key or keys. Further, the at least one key may include an individualized portion, which allows subsets of the content that do not share a common portion to be deleted individually.

Although illustrated in the present example with two software modules, it should be understood that CN computing system 1000 might include any number of software modules to carry out the purging processes described herein.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein can be in the form of a functional diagram, operational sequence, or flow diagram, and can be described as a series of acts, it is to be understood and appreciated that the methodologies are not limited by the order of acts, as some acts can, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology can be required for a novel implementation.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above.

What is claimed is:

1. A method of operating a computing system that stores encrypted data objects, the method comprising:

receiving a purge request to erase one or more selected data objects of the encrypted data objects, wherein each of the encrypted data objects is encrypted using an encryption key unique to the encrypted data object, and wherein each of the encryption keys comprises a plurality of portions, comprising at least an individualized portion, which corresponds uniquely to one of the encrypted data objects, and a common portion, which corresponds to multiple of the encrypted data objects;

in response to the purge request and for each data object of the one or more selected data objects, identifying an encryption key associated with the data object;

identifying a type of purge request associated with the purge request; and erasing a portion of the plurality of portions of the encryption key for each of the one or more selected data objects based on the type of purge request.

2. The method of claim 1 further comprising encrypting data objects to create the encrypted data objects using the encryption keys.

3. The method of claim 2, wherein identifying a type of purge request associated with the purge request comprises identifying whether the purge request indicates a request to purge all of the encrypted data objects associated with the common portion or a request to purge a subset of the encrypted data objects associated with the common portion that is less than all of the encrypted data objects associated with the common portion.

4. The method of claim 3, wherein erasing a portion of the encryption key for each of the one or more selected data objects based on the type of purge request comprises:

if the purge request indicates a request to purge all of the encrypted data objects associated with the common portion, erasing the common portion of the encryption key;

if the purge request indicates a request to purge a subset of the encrypted data objects associated with the common portion that is less than all of the encrypted data objects associated with the common portion, erasing the individualized portion of the encryption key for each of the one or more selected data objects.

5. The method of claim 1, wherein the encrypted data objects comprise hypertext markup (HTML) pages, images, audio files, or videos.

6. The method of claim 1, wherein the computing system comprises a content node that caches the encrypted data objects between origin servers and end user devices.

7. The method of claim 6, wherein the encrypted data objects correspond to a first service provider, and wherein the computing system stores additional data objects corresponding to one or more additional service providers.

8. A computing apparatus comprising:
one or more non-transitory computer readable storage media;
a processing system operatively coupled with the one or more non-transitory computer readable media; and
processing instructions stored on the one or more non-transitory computer readable storage media to store encrypted data objects on a computing system that, when read and executed by the processing system, direct the processing system to at least:
receive a purge request to erase one or more selected data objects of the encrypted data objects, wherein each of the encrypted data objects is encrypted using an encryption key unique to the encrypted data object, and wherein each of the encryption keys comprises a plurality of portions, comprising at least an individualized portion, which corresponds uniquely to one of the encrypted data objects, and a common portion, which corresponds to multiple of the encrypted data objects;
in response to the purge request and for each data object of the one or more selected data objects, identify an encryption key associated with the data object;
identify a type of purge request associated with the purge request; and
erase a portion of the plurality of portions of the encryption key for each of the one or more selected data objects based on the type of purge request.

9. The computing apparatus of claim 8, wherein the program instructions further direct the processing system to encrypt data objects to create the encrypted data objects using the encryption keys.

10. The computing apparatus of claim 9, wherein identifying a type of purge request associated with the purge request comprises identifying whether the purge request indicates a request to purge all of the encrypted data objects associated with the common portion or a request to purge a subset of the encrypted data objects associated with the common portion that is less than all of the encrypted data objects associated with the common portion.

11. The computing apparatus of claim 10, wherein erasing a portion of the encryption key for each of the one or more selected data objects based on the type of purge request comprises:

if the purge request indicates a request to purge all of the encrypted data objects associated with the common portion, erasing the common portion of the encryption key;

if the purge request indicates a request to purge a subset of the encrypted data objects associated with the common portion that is less than all of the encrypted data objects associated with the common portion, erasing the individualized portion of the encryption key for each of the one or more selected data objects.

12. The computing apparatus of claim 8, wherein the encrypted data objects comprise hypertext markup (HTML) pages, images, audio files, or videos.

13. The computing apparatus of claim 8, wherein the computing system comprises a content node that caches the encrypted data objects between origin servers and end user devices.

14. The computing apparatus of claim 8, wherein the encrypted data objects correspond to a first service provider, and wherein the computing system stores additional data objects corresponding to one or more additional service providers.

15. An apparatus comprising:
one or more non-transitory computer readable storage media; and
processing instructions stored on the one or more non-transitory computer readable storage media to store encrypted data objects on a computing system that, when read and executed by a processing system, direct the processing system to at least:
receive a purge request to erase one or more selected data objects of the encrypted data objects, wherein each of the encrypted data objects is encrypted using an encryption key unique to the encrypted data object, and wherein each of the encryption keys comprises a plurality of portions, comprising at least an individualized portion, which corresponds uniquely to one of the encrypted data objects, and a common portion, which corresponds to multiple of the encrypted data objects;
in response to the purge request and for each data object of the one or more selected data objects, identify an encryption key associated with the data object;
identify a type of purge request associated with the purge request; and
erase a portion of the plurality of portions of the encryption key for each of the one or more selected data objects based on the type of purge request.

16. The apparatus of claim 15, wherein the program instructions further direct the processing system to encrypt data objects to create the encrypted data objects using the encryption keys.

17. The apparatus of claim 16, wherein identifying a type of purge request associated with the purge request comprises identifying whether the purge request indicates a request to purge all of the encrypted data objects associated with the common portion or a request to purge a subset of the encrypted data objects associated with the common portion that is less than all of the encrypted data objects associated with the common portion.

18. The apparatus of claim 17, wherein erasing a portion of the encryption key for each of the one or more data objects based on the type of purge request comprises:
- if the purge request indicates a request to purge all of the encrypted data objects associated with the common portion, erasing the common portion of the encryption key;
- if the purge request indicates a request to purge a subset of the encrypted data objects associated with the common portion that is less than all of the encrypted data objects associated with the common portion, erasing the individualized portion of the encryption key for each of the one or more selected data objects.

19. The apparatus of claim 15, wherein the computing system comprises a content node that caches the encrypted data objects between origin servers and end user devices.

20. The apparatus of claim 15, wherein the encrypted data objects correspond to a first service provider, and wherein the computing system stores additional data objects corresponding to one or more additional service providers.

* * * * *